United States Patent
Yang et al.

[11] Patent Number: 5,848,211
[45] Date of Patent: Dec. 8, 1998

[54] PHOTONICS MODULE HAVING ITS COMPONENTS MOUNTED ON A SINGLE MOUNTING MEMBER

[75] Inventors: Long Yang, Union City; Gary Trott, San Mateo, both of Calif.

[73] Assignee: Hewlett-Packard Company, Palo Alto, Calif.

[21] Appl. No.: 705,874

[22] Filed: Aug. 28, 1996

[51] Int. Cl.⁶ .................................................. G02B 6/43
[52] U.S. Cl. ............................... 385/93; 385/88; 385/33; 385/35; 438/27; 372/101; 372/107; 359/664
[58] Field of Search ......................... 385/33, 35, 88–94, 385/93; 372/6, 36, 101, 107, 108; 359/664, 811, 819; 257/432; 437/209; 438/27

[56] References Cited

U.S. PATENT DOCUMENTS

| | | | |
|---|---|---|---|
| 5,124,281 | 6/1992 | Ackerman et al. | 437/209 |
| 5,181,216 | 1/1993 | Ackerman et al. | 372/36 |
| 5,291,572 | 3/1994 | Blonder et al. | 385/94 |
| 5,307,434 | 4/1994 | Blonder et al. | 385/91 |
| 5,367,589 | 11/1994 | MacDonald et al. | 385/37 |
| 5,408,559 | 4/1995 | Takahashi et al. | 385/89 |
| 5,439,782 | 8/1995 | Haemmerle et al. | 430/321 |
| 5,600,741 | 2/1997 | Hauer et al. | 385/93 X |

*Primary Examiner*—Phan T. H. Palmer
*Attorney, Agent, or Firm*—Thomas X. Li

[57] ABSTRACT

A photonics apparatus is described. The photonics apparatus includes a plurality of components and a mounting member for mounting the components. The mounting member and the components are structured such that all of the components of the photonics module are precisely mounted and aligned on the mounting member without requiring active alignment and additional mounting member. The components mounted on the mounting member include at least a laser, a photo detector, and two spherical lenses. The components may also include an optical filter and a mirror. The mounting member is made of silicon such that a photolithographic masking and etching process can be used to precisely process the mounting member to mount these components. The photo detector includes an integrated mirror. The optical filter and the mirror may be integrated together to form an integrated device that is attached to the mounting member. A method of making the photonics apparatus is also described.

9 Claims, 13 Drawing Sheets

5,848,211

PHOTONICS MODULE HAVING ITS COMPONENTS MOUNTED ON A SINGLE MOUNTING MEMBER

CROSS-REFERENCES TO RELATED APPLICATIONS

The present application is related to
1. U.S. patent application Ser. No. 08/705,867, by Gary R. Trott, entitled AN IMPROVED MICRO-PHOTONICS MODULE, filed on the same date as the present application, and assigned to the same assignee of the present application;
2. U.S. patent application Ser. No. 08/705,873, by Long Yang, entitled A PHOTO DETECTOR WITH AN INTEGRATED MIRROR AND A METHOD OF MAKING THE SAME, filed on the same date as the present application, and assigned to the same assignee of the present application;
3. U.S. patent application Ser. No. 08/705,872, by Long Yang, entitled FABRICATING AN OPTICAL DEVICE HAVING AT LEAST AN OPTICAL FILTER AND A MIRROR, filed on the same date as the present application, and assigned to the same assignee of the present application;
4. U.S. patent application Ser. No. 08/705,870, by Gary R. Trott, Kent W. Carey, and Long Yang, entitled MOUNTING A PLANAR OPTICAL COMPONENT ON A SEMICONDUCTOR MOUNTING MEMBER, filed on the same date as the present application, and assigned to the same assignee of the present application.

BACKGROUND OF THE INVENTION

1. Field of the Invention

The present invention pertains to fiber optics or photonics modules. More particularly, this invention relates to a photonics module having its components mounted on a single mounting member.

2. Description of the Related Art

Optical communications systems are widely used for carrying very large amount of information with low error rate and at low cost over great distances. For this reason, considerable development has been done on components of optical communication systems, such as photonics packages or modules. Photonics generally refers to devices that share both electronic and optical attributes. These devices can be laser devices, which generate coherent light in response to an electronic signal, and photo detectors, which generate an electronic signal in response to light.

Typically, bidirectional photonics modules use edge emitting semiconductor lasers and surface detecting photo detectors (see FIG. 1). As can be seen from FIG. 1, since an edge emitting laser 11 has a relatively wide radiation angle, a lens 12 is typically inserted between the laser 11 and an optical fiber 13 to obtain high optical coupling efficiency. In addition, a lens 17 is typically inserted between the optical fiber 13 and a photo detector 15. The inserted lens 17 improves the optical coupling efficiency between the optical fiber 13 and the photo detector 15. Because the photonics module 10 is a bidirectional module, an optical filter 18 is used to reflect the light beam emitted from the optical fiber 13 to the lens 17 and to allow the light beam from the lens 12 to reach the optical fiber 13.

In making the photonics module 10, the laser 11, the lens 12, the optical filter 18, and the optical fiber 13 must be in precise predetermined alignment with one another. In addition, the optical fiber 13, the optical filter 18, the lens 17, and the photo detector 15 must be in precise predetermined alignment with one another. To achieve this, fixtures and/or mounts are typically needed to hold the components in place and in alignment with one another, as shown in FIG. 2.

As can be seen from FIG. 2, a fixture 21 is used to hold the lens 12 in place and in predetermined alignment with the laser 11 that is also mounted on the fixture 21. This fixture 21 is then coupled to another fixture 22 that holds the optical fiber 13 and the optical filter 18 in place. A third fixture 20 is used to hold the lens 17 in place and in alignment with the photo detector 15. The fixture 20 also mounts and secures the photo detector 15. Because the photo detector 15 is the surface detecting photo detector (as shown in FIG. 2), the photo detector 15 is mounted on the fixture 20 perpendicular to the incoming light, as shown in FIG. 2. The fixture 20 is also coupled to the fixture 22. The alignment of the laser 11, the lenses 12 and 17, the photo detector 15, the optical filter 18, and the optical fiber 13 is achieved by the fixtures 20 through 22.

One disadvantage of such photonics modules or packages is that the fixtures are typically relatively costly to fabricate because they typically require relatively high precision. Another disadvantage is that it is typically time consuming to assemble the photonics modules using the fixtures, thus causing low throughput. In addition, time may also be needed for alignment and adjustment during assembling the photonics modules. This typically hinders mass-production of the photonics modules by operators having a moderate level of skill while maintaining the required alignment criteria. These factors typically limit the cost reduction of the photonics modules. Moreover, these photonics modules typically have relatively large size because the fixtures are coupled together.

SUMMARY OF THE INVENTION

The present invention is to fabricate a photonics module in a cost effective manner.

The present invention is to reduce the size of a photonics module.

The present invention is to mount components of a photonics module on a single mounting member.

Described below is a photonics apparatus that includes a plurality of components and a mounting member for mounting the components. The mounting member and the components are structured such that all of the components of the photonics module are precisely mounted and aligned on the mounting member without requiring active alignment and additional mounting member.

The components mounted on the mounting member include at least a laser, an integrated photo detector, two spherical lenses, and an optical filter. The mounting member is made of silicon such that a photo-lithographic masking and etching process can be used to precisely process the mounting member to mount these components. The integrated photo detector includes an integrated mirror.

Moreover, the optical filter can be integrated with a mirror into an integrated device. The integrated device is attached to a side surface of the mounting member.

A method of making the photonics apparatus is also described. The method includes the step of forming a first and a second substantially pyramidal cavity in the mounting member at a predetermined distance. The laser is then mounted on the mounting member such that an optical axis of the laser is aligned with a diagonal of the first pyramidal cavity. The first and second spherical lenses are placed in the respective first and second pyramidal cavities. The integrated photo detector is formed by integrating the mirror to face an active area of the photo detector. The integrated photo detector is then mounted on the mounting member with the active area of the photo detector parallel to a top surface of the mounting member and the mirror facing a diagonal of the second pyramidal cavity.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
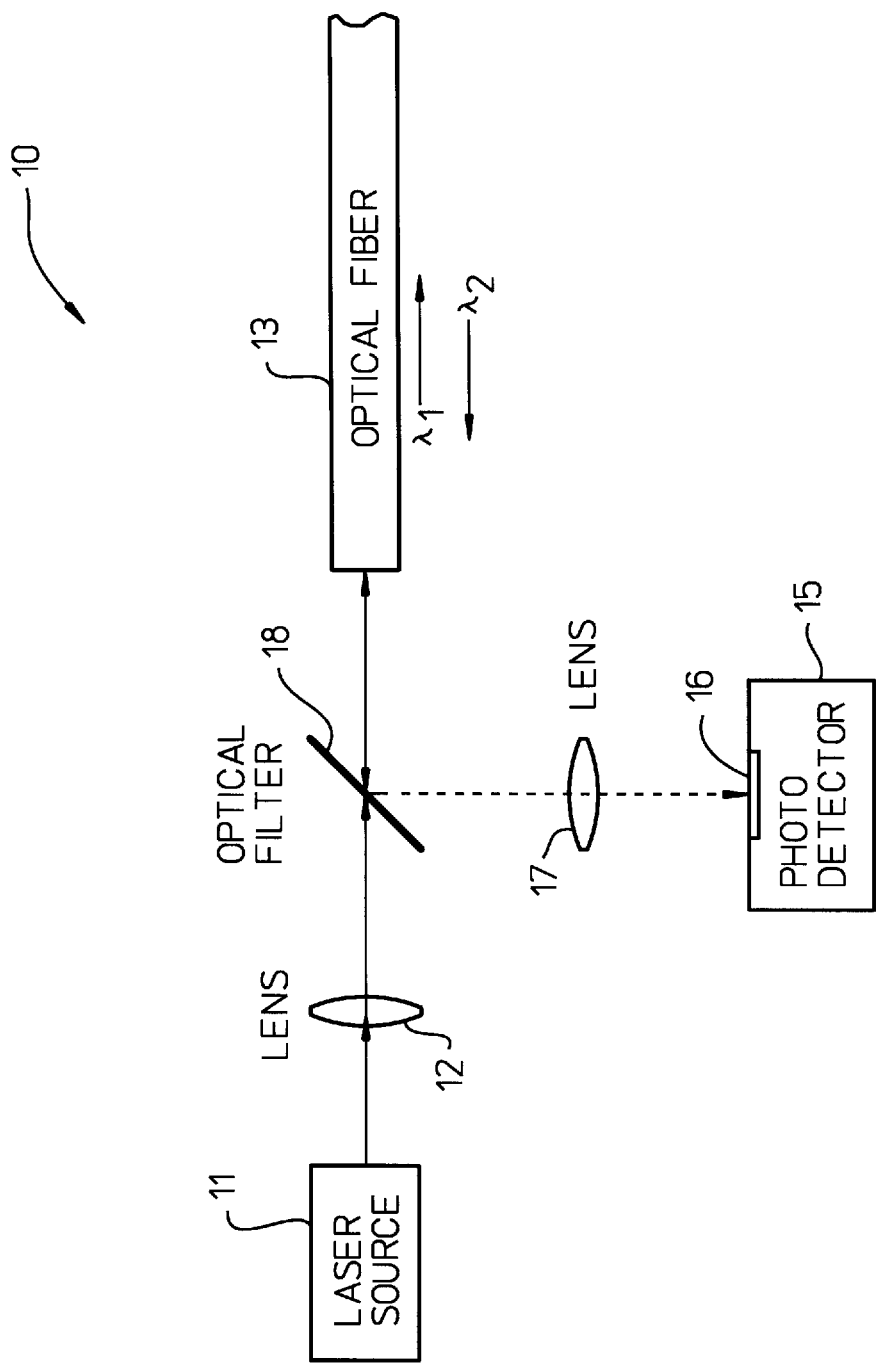
FIG. 1 schematically shows a prior art bidirectional photonics module.
Figure 2:
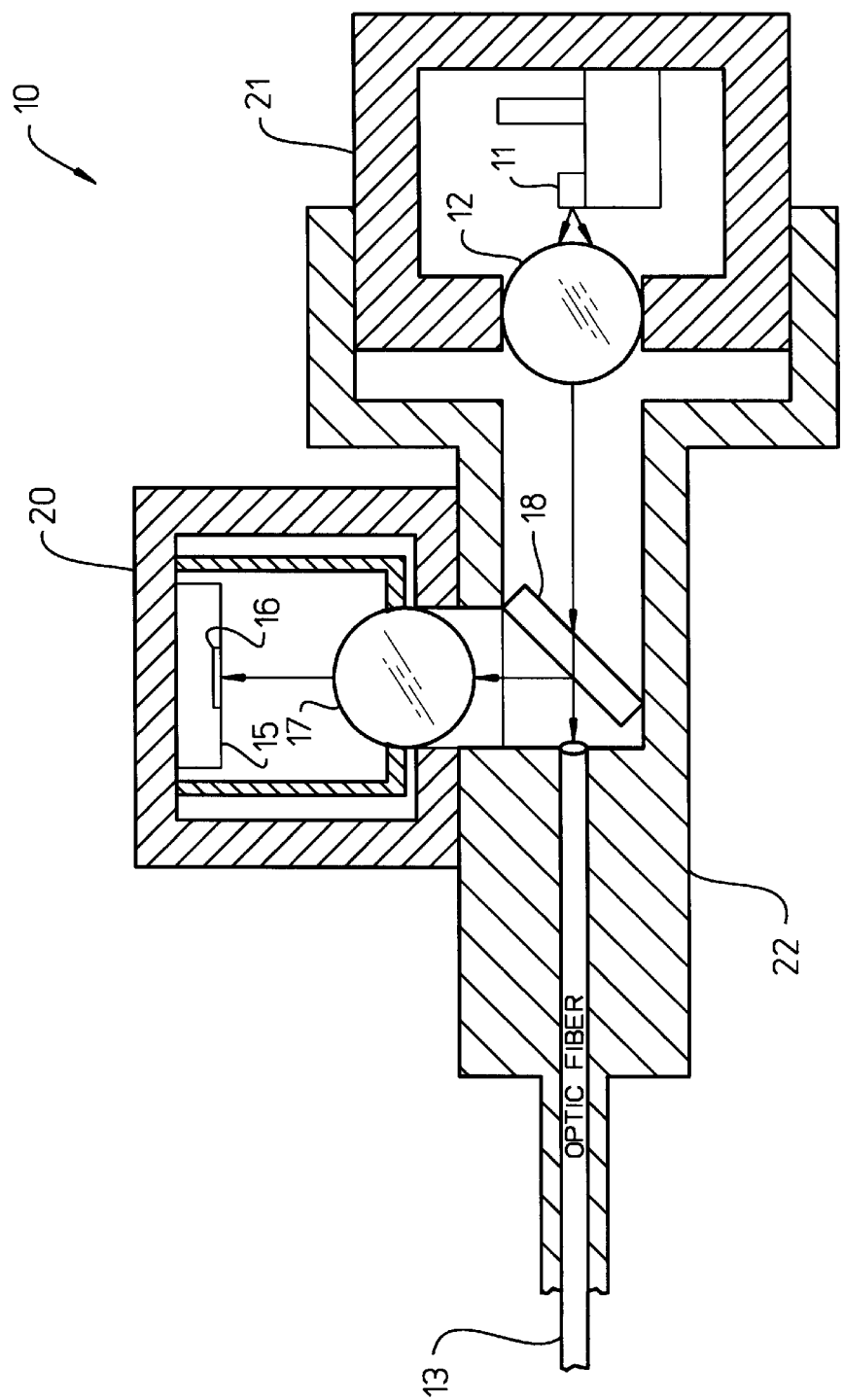
FIG. 2 is a side cross sectional view showing the package of the bidirectional photonics module of FIG. 1.
Figure 3:
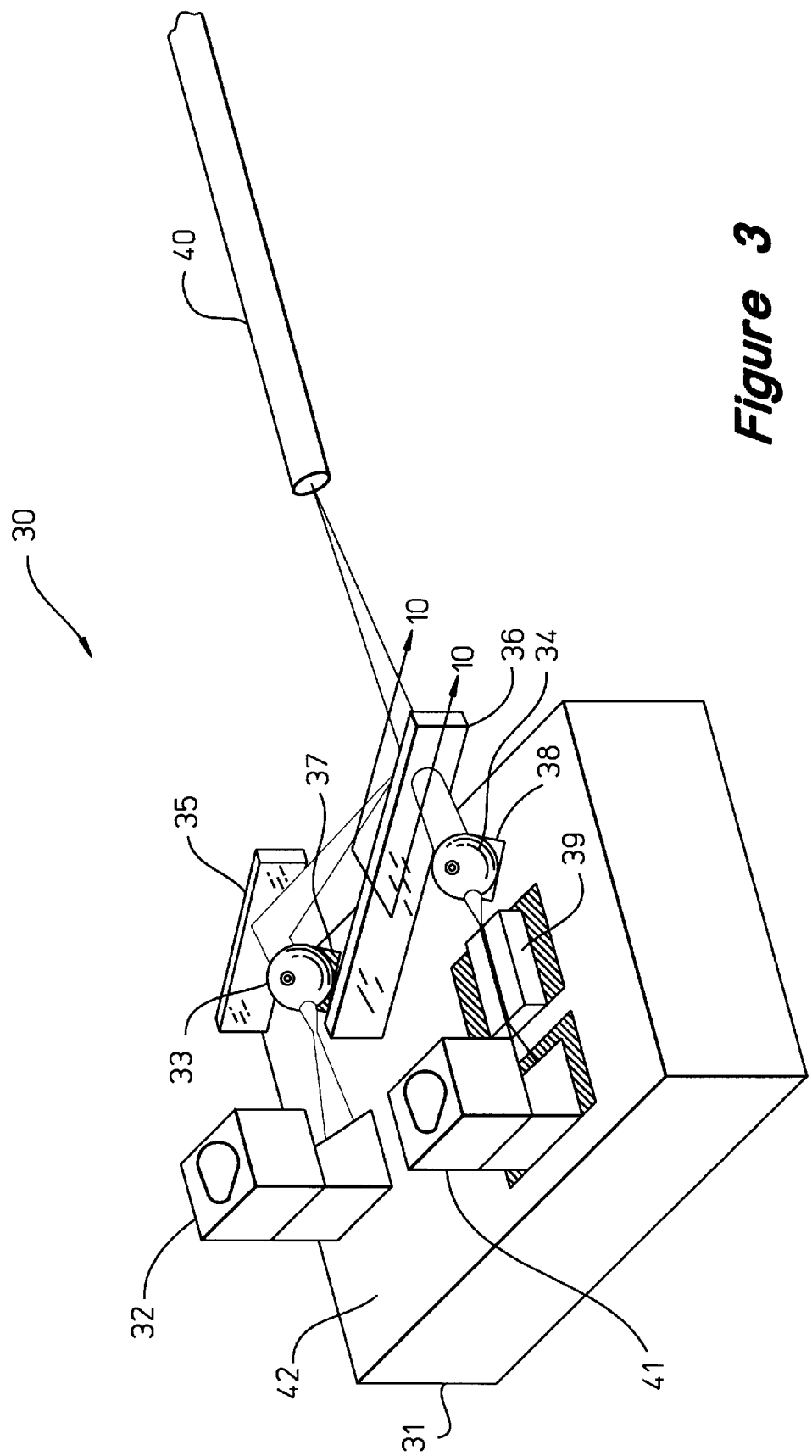
FIG. 3 is a perspective view of a photonics module having its components mounted on a single mounting member.
Figure 4:
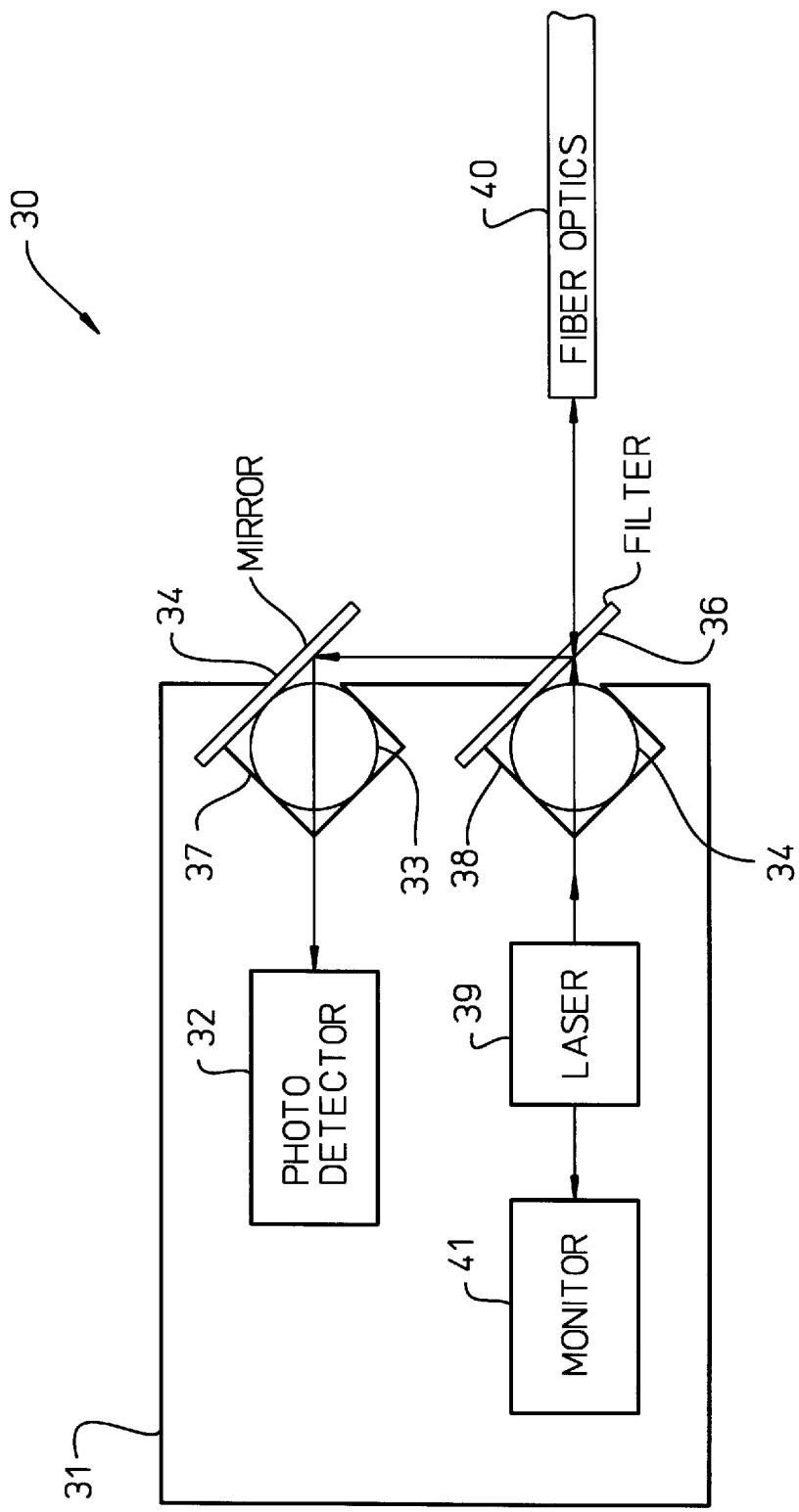
FIG. 4 is a top view of the photonics module of FIG. 3.

FIGS. 3 and 4 show an arrangement of integrating components of a photonics module 30 on a single mounting member 31. In accordance with one embodiment, this is done without requiring active alignment and additional mounting member. Active alignment means aligning the components with some feedback indicating whether adjustment is needed for the alignment. By integrating the components of the photonics module 30 on the single mounting member 31, the size of the photonics module 30 is significantly reduced. In addition, the cost of fabricating the photonics module 30 is reduced because only one mounting member (i.e., the mounting member 31) is required. The cost of making the photonics module 30 is further reduced because the mounting member 31 is made by batch processing. The arrangement will be described in more detail below, in conjunction with FIGS. 3 through 13.

As can be seen from FIGS. 3–4, the photonics module 30 is a bidirectional photonics module. Alternatively, the photonics module 30 may not be bidirectional. For example, the photonics module 30 may be tri-directional or unidirectional.

The photonics module 30 includes integrated photo detectors 32 and 41, spherical lenses 33 and 34, a mirror 35 and a planar optical filter 36. An external optical fiber 40 is actively aligned to the spherical lenses 33 and 34 via the optical filter 36 after the components of the photonics module 30 have been assembled. The photo detector 41 functions as a back facet monitor of the laser 39. Alternatively, the photonics module 30 may function with more or fewer than above-described components. For example, the mirror 35 may not be used in the photonics module 30. As a further example, the photonics module 30 may include an additional mirror.

In one embodiment as shown in FIGS. 3–4, the spherical lenses 33 and 34 are ball lenses. Alternatively, the spherical lenses 33–34 can be other types of spherical lenses.

In one embodiment, the mounting member 31 is made of silicon. Using silicon for the mounting member 31 allows the components of the photonics module 30 to be mounted on the mounting member 31 using a photo-lithographic masking and etching process which is widely used in fabricating semiconductor integrated circuits with a great deal of accuracy. This causes these components of the photonics module 30 to be placed on the mounting member 31 with a great deal of accuracy. Moreover, this also allows the mounting member 31 to be fabricated using batch processing.

In one embodiment, the mounting member 31 is made of a crystalline silicon with <100> crystallographic surfaces. This type of silicon is referred to as <100> silicon below. Alternatively, the mounting member 31 can be made of other materials. For example, ceramic or metal materials can be used to make the mounting member 31.

The size of the mounting member 31 depends on the size of the photo detector 32, the laser 39, and the spherical lenses 33–34. Because the photo detector 32 and the laser 39 can range from 300 microns to 1 millimeter and each of the spherical lenses 33–34 can range from 300 microns to 3 millimeters, the size of the mounting member 31 can be as small as approximately 600 microns×600 microns.

Figure 5:
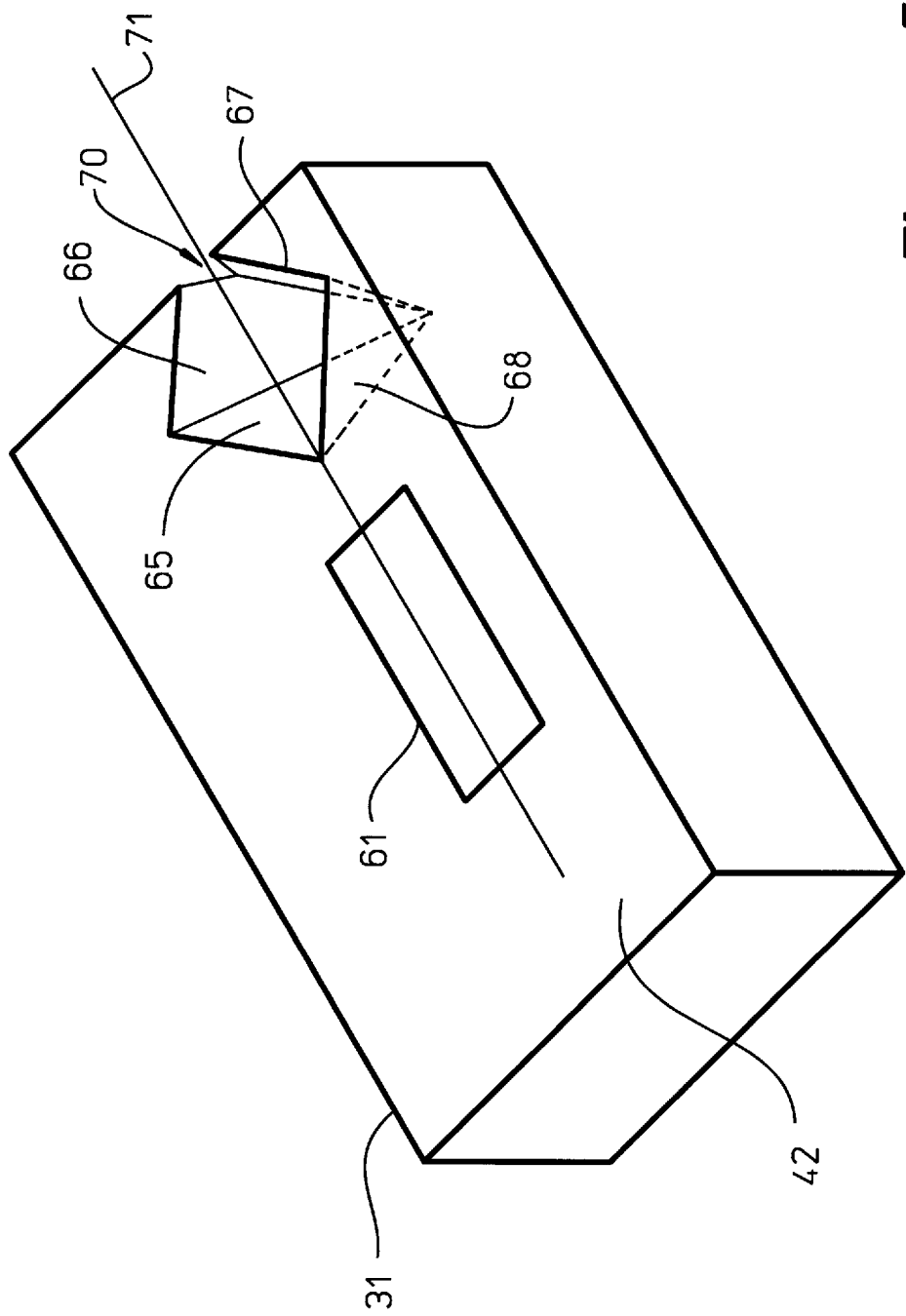
FIG. 5 is a perspective view of a portion of the mounting member of FIGS. 3–4, showing a pyramidal cavity for seating a spherical lens of the photonics module.

To mount all of the components of the photonics module 30 on the mounting member 31, the laser 39 is directly bonded to the top surface 42 of the mounting member 31. In one embodiment, the laser 39 is an edge-emitting laser. To mount and align the spherical lenses 33–34 on the mounting member 31, pyramidal cavities 37 and 38 are formed on the mounting member 31 to seat the spherical lenses 33–34. The pyramidal cavities 37–38 are precision-formed in the mounting member 31. When the mounting member 31 is made of the <100> silicon, the mounting member 31 can be anisotropically etched using, for example, a KOH (i.e., potassium hydroxide) etchant to form each of the cavities 37–38. FIG. 5 shows the structure of a cavity 60 which represents either one of the cavities 37–38.

As can be seen from FIG. 5, the pyramidal cavity 60 has side walls (e.g., the side walls 65 through 68) formed by the anisotropic etching. The speed of the anisotropic etching to form the cavity 60 can be 1000 to 1 under some condition. This means that the vertical etching rate into the silicon mounting member 31 is 1000 times faster than the speed of etching towards the <111> crystallographic planes of the silicon mounting member 31. In other words, the <111> crystallographic planes serve as etch stops. The anisotropic etching causes the etched side walls 65–68 of the cavity 60 of the mounting member 31 to lie on the <111> crystallographic planes of the mounting member 31. As is known, the <111> crystallographic planes intersect the <100> crystallographic planes of the mounting member 31 at approximately 54.7°. When the top and bottom surfaces of the mounting member 32 lie on the <100> planes, the side walls 65–68 of the cavity 60 intersect the top and bottom surfaces of the mounting member 31 at approximately 54.7°.

Alternatively, the side walls 65–68 of the cavity 60 can intersect the top and bottom surfaces of the mounting member 31 at an angle greater or less than 54.7°. For example, the mounting member 31 can be made (e.g., polished) such that its surfaces do not lie on the <100> planes of the mounting member 31. In this case, the surfaces of the mounting member 31 are at a predetermined angle β with the <100> planes. This causes the <111> crystallographic planes of the mounting member 31 to intersect the top and bottom surfaces of the mounting member 31 at an angle that is equal to 54.7°±β.

The cavity 60 has a substantially square opening defined by the intersection of the side walls 65–68 with the top surface 42 of the mounting member 31. The cavity 60 also has a V-shaped notch 70 formed at one corner of the square opening of the cavity 60. A metal pad 61 is deposited on the mounting member 31 for mounting either the laser 39 or the photo detector 32. As can be seen from FIG. 5, the pad 61 is aligned with one diagonal of the cavity 60. This causes the optical axis 71 of the photonics element (i.e., either the laser 39 or the photo detector 32 of FIGS. 3–4) mounted on the pad 61 to be aligned or collinear with that diagonal of the cavity 60 while the other diagonal of the cavity 60 is perpendicular to the optical axis 71.

Figure 6:
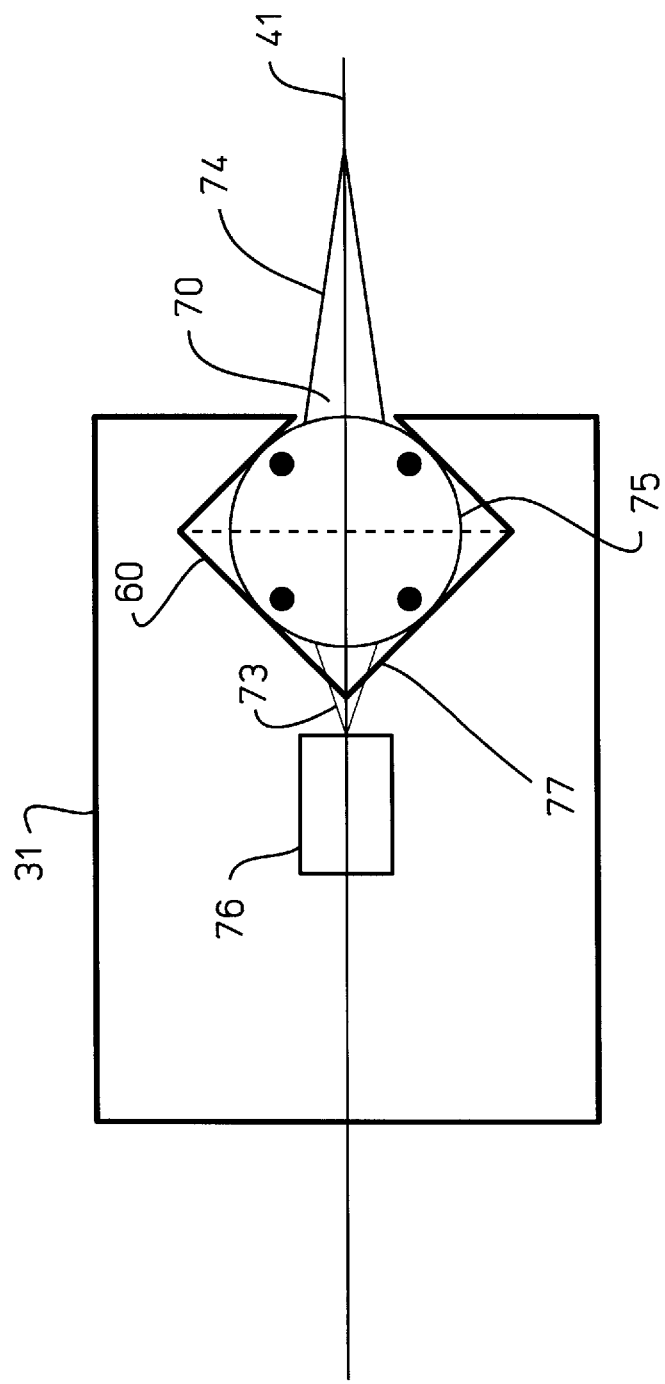
FIG. 6 is a top view of the portion of the mounting member of FIG. 5.
Figure 7:
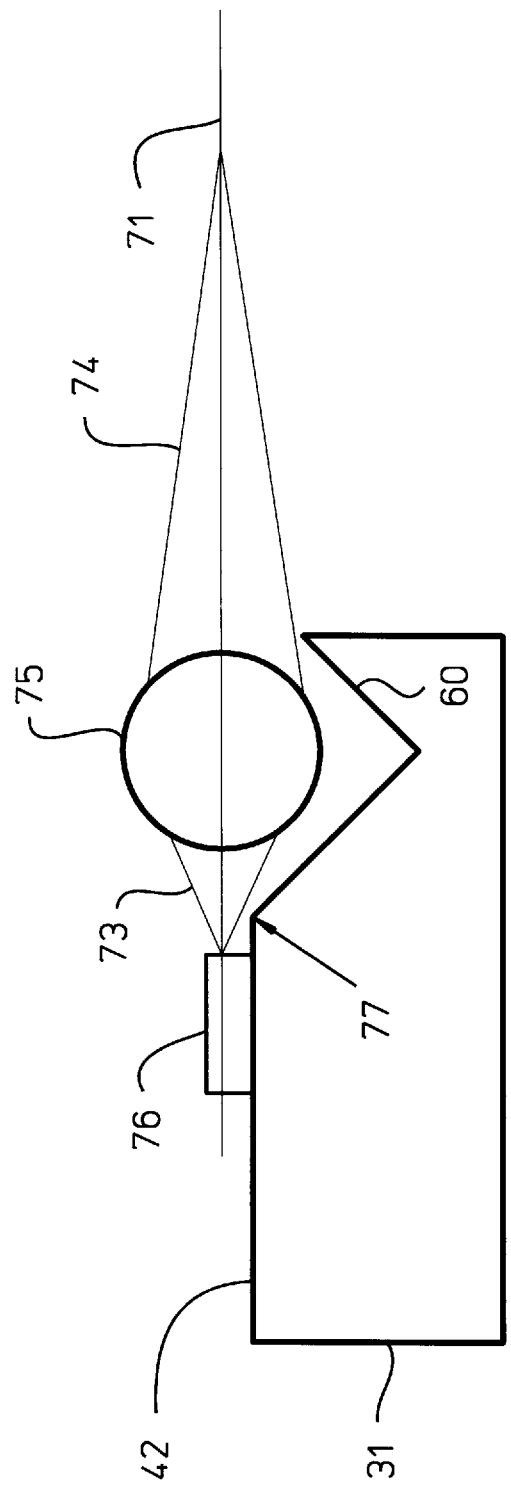
FIG. 7 is a cross-sectional side view of the mounting member along line 71 of FIG. 6.

As can be seen from FIGS. 6 and 7, when a spherical lens 75 (i.e., either of the spherical lenses 33–34) is seated in the cavity 60 and a photonics element 76 (i.e., either the laser 39 or the photo detector 32) is bonded to the metal pad 61, the light beam path 73 between the photonics element 76 and the spherical lens 75 is allowed to extend into the pyramidal cavity 60 below the top surface 42 of the mounting member 31 without any beam obstruction by the mounting member 31. In other words, a light beam channel is created at the corner 77 for the light beam path 73 (see FIGS. 6–7). This allows light beam to reach the spherical lens 75 from the photonics element 76 (or vice versa) without any beam obstruction, thus achieving a high optical coupling efficiency. The V-shaped notch 70 provides beam clearance at the other side of the pyramidal cavity 60 for the spherical lens 75. The function of the V-shaped notch 70 is to create a clear and unobstructed light beam path 74 along the optical axis 71, as shown in FIGS. 6–7.

Alternatively, other mechanisms can be used to provide the beam clearance. For example, another cavity can be formed adjacent to the pyramidal cavity 60 such that the two cavities overlapping each other to form the V-shaped notch. The pyramidal cavity 60 and its alternative embodiments are described in more detail in the co-pending application Ser. No. 08/705,867, entitled AN IMPROVED MICRO-PHOTONICS MODULE, filed on the same date as the present application, and assigned to the same assignee as the present application.

Referring back to FIGS. 3–4, to mount all of the components of the photonics module 30 on the mounting member 31, each of the integrated photo detectors 32 and 41 includes a surface-detecting photo detector and an integrated mirror such that the integrated photo detectors can be directly bonded to the top surface 42 of the mounting member 31.

As is known, it is typically difficult to vertically mount a surface-detecting photo detector on a mounting member like the mounting member 31, with its front surface perpendicular to the top surface 42 of the mounting member 31. To horizontally mount or position a surface-detecting photo detector on the mounting member 31 with its active area parallel to the light traveling on the mounting member 31, a mirror is required in the optical path of the surface-detecting photo detector to deflect the incoming light beam. The mirror is positioned at an angle of approximately 45° or 54° with respect to the optical axis of the incoming light beam such that the deflected light beam is substantially perpendicular to the active area of the photo detector.

The mirror introduces an additional optical element to be mounted on the mounting member 31. In addition, active alignment is needed for the mirror when mounted on the mounting member 31.

To overcome this, the mirror and the surface-detecting photo detector are integrated together to form an integrated photo detector that is identical to each of the integrated photo detectors 32 and 41. This simplifies the mounting of the integrated photo detectors 32 and 41 on the mounting member 31 and reduces the packaging cost of the photonics module 30. In addition, only one alignment is required to mount each of the integrated photo detectors 32 and 41 on the mounting member 31. Moreover, the integration allows each of the integrated photo detectors 32 and 41 to be fabricated by batch processing such that the cost associated with the integration is reduced. FIG. 3 does not show the complete structure of each of the photo detectors 32 and 41. The complete structure of each of the photo detectors 32 and 41 is shown in FIGS. 8 and 9, which will be described in more detail below.

Figure 8:
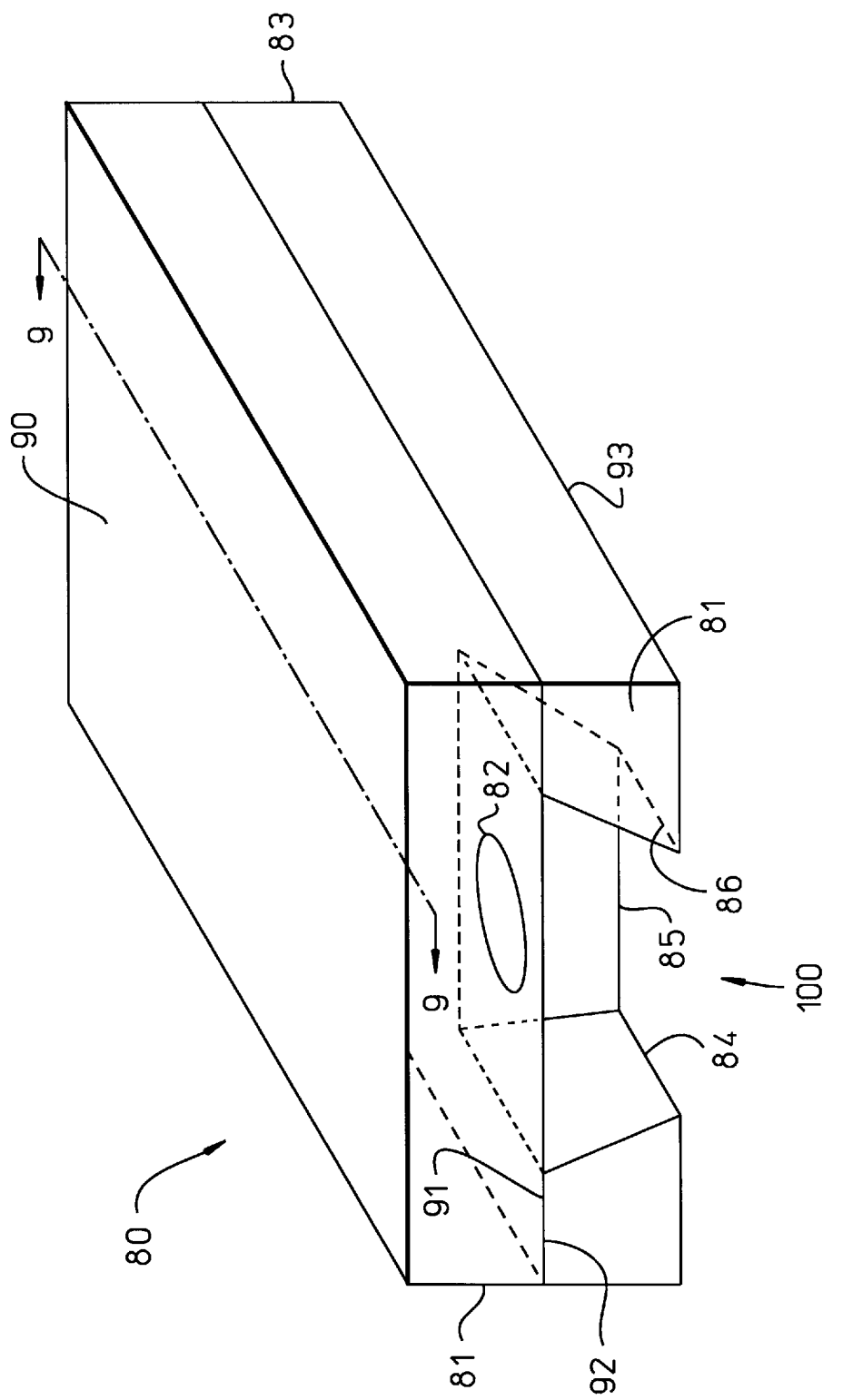
FIG. 8 is a perspective view of an integrated photo detector of the photonics module of FIGS. 3 and 4.
Figure 9:
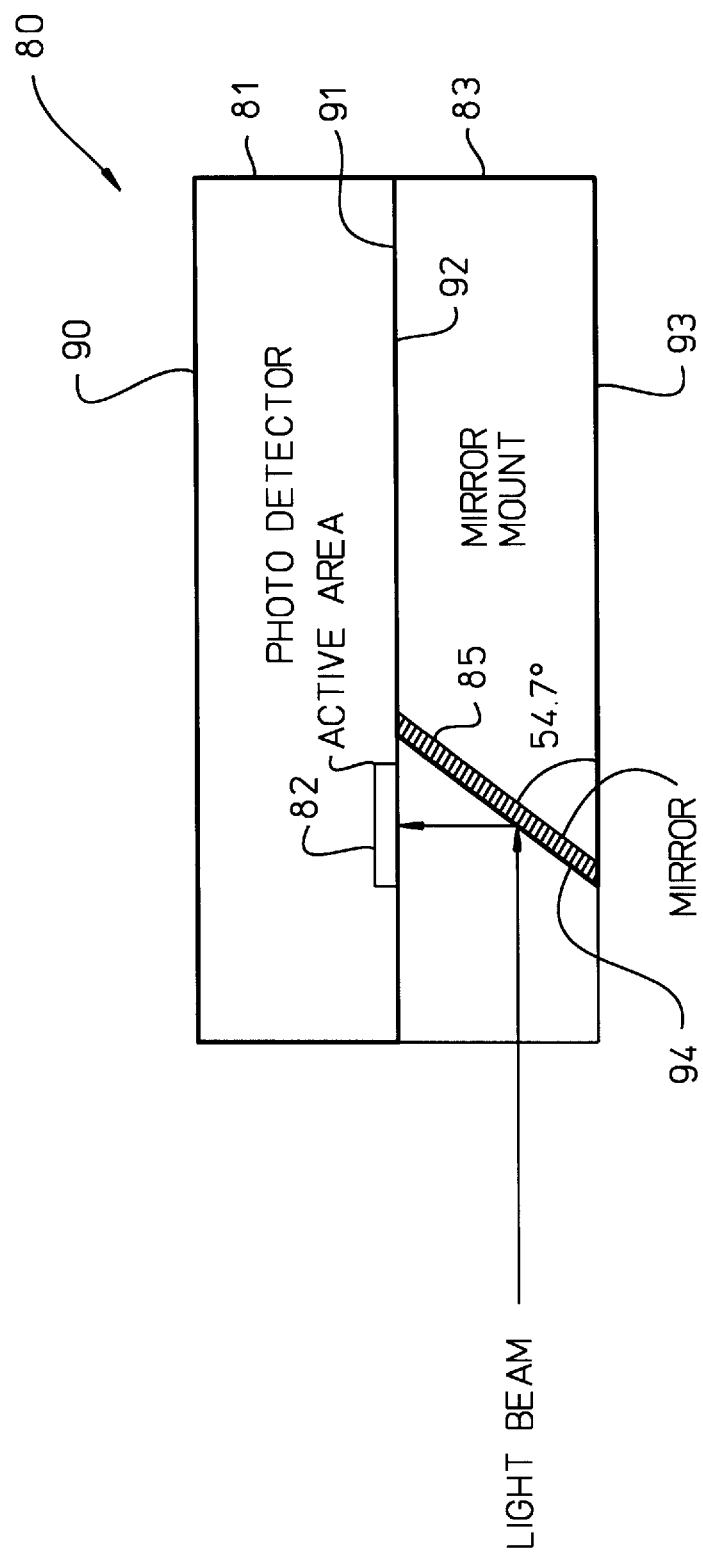
FIG. 9 is a cross-sectional side view of the integrated photo detector along line 9—9 of FIG. 8.

FIG. 8 shows a perspective view of an integrated photo detector 80 which represents either of the integrated photo detectors 32 and 41 of FIGS. 3–4. FIG. 9 shows the side cross-sectional view of the integrated photo detector 80 along line 9—9 of FIG. 8. As can be seen from FIGS. 8–9, the integrated photo detector 80 includes a surface-detecting photo detector 81 and a mirror mount 83. The photo detector 81 includes an active area 82. The photo detector 81 is a semiconductor photo detector, having its active area 82 formed on a semiconductor substrate. Each of the front and back surfaces 90 and 91 of the photo detector 81 is coated with a metal layer (not shown) that serves as an electrode of the photo detector 81.

In one embodiment, the material used to make the mirror mount 83 is a crystalline silicon material with <100> crystallographic surfaces. In other embodiments, the mirror mount 83 can be made of ceramic materials or metals. The mirror mount 83 described below uses the crystalline silicon material with <100> crystallographic surfaces as an example.

In one embodiment, the top and bottom surfaces 92 and 93 of the mirror mount 83 lie on the <100> crystallographic planes of the mirror mount 83. In other embodiments, the top and bottom surfaces of the mirror mount 83 do not lie on the <100> planes and intersect the <100> planes at a predetermined angle.

The mirror mount 83 includes an opening 100 in one side 101 of the mirror mount 83. The opening 100 has a dovetail shape and is defined by three sloping side walls 84 through 86. The side walls 84–86 lie on <111> crystallographic planes of the crystalline mirror mount 83 such that they intersect the top surface of the mirror mount 83 at a predefined angle. For example, when the top and bottom surfaces of the mirror mount 83 lie on the <100> planes, each of the side walls 84–86 intersects the top and bottom surfaces of the mirror mount 83 at an angle of approximately 54.7°, as shown in FIG. 9.

By causing the side walls 84–86 to lie on the <111> planes, the side walls 84–86 are made very smooth and exhibit a mirror-like effect. This means that each of the side walls 84–86 is in fact a reflective surface and can function as a reflector or a mirror.

To increase the reflectivity of the side walls 84–86, a highly reflective metal layer (e.g., the metal layer 94 FIG. 9) is applied to each of the side walls 84–86. When the metal layer 94 is formed on the side wall 85, the metal layer 94 serves as a mirror or reflector. When the side wall 85 is not applied with a metal layer, the side wall 85 functions as a mirror or reflector.

In addition, a metal layer (not shown in FIGS. 8–9) is also applied to each of the top and bottom surfaces 92–93 of the mirror mount 83. This allows the metal layer on the bottom surface 93 of the mirror mount 83 to contact the metal layer on the top surface 92 via the metal layers (e.g., the metal layer 94). This connection allows the metal layer on the bottom surface 93 of the mirror mount 83 to function as one of the electrodes of the photo detector 81.

The photo detector 81 is attached to the mirror mount 83. The attachment is such that the active area 82 of the photo detector 81 faces the opening 100 of the mirror mount 83. In this case, the active area 82 of the photo detector 81 is aligned with the mirror 94 in the opening 100 at approximately 54.7°, as can be seen from FIG. 9. The integrated photo detector 80 and the method of fabricating the integrated photo detector 80 are described in more detail in the co-pending application Ser. No. 08/705,867, entitled A PHOTO DETECTOR WITH AN INTEGRATED MIRROR AND A METHOD OF MAKING THE SAME, filed on the same date as the present application, and assigned to the same assignee of the present application.

Figure 10:
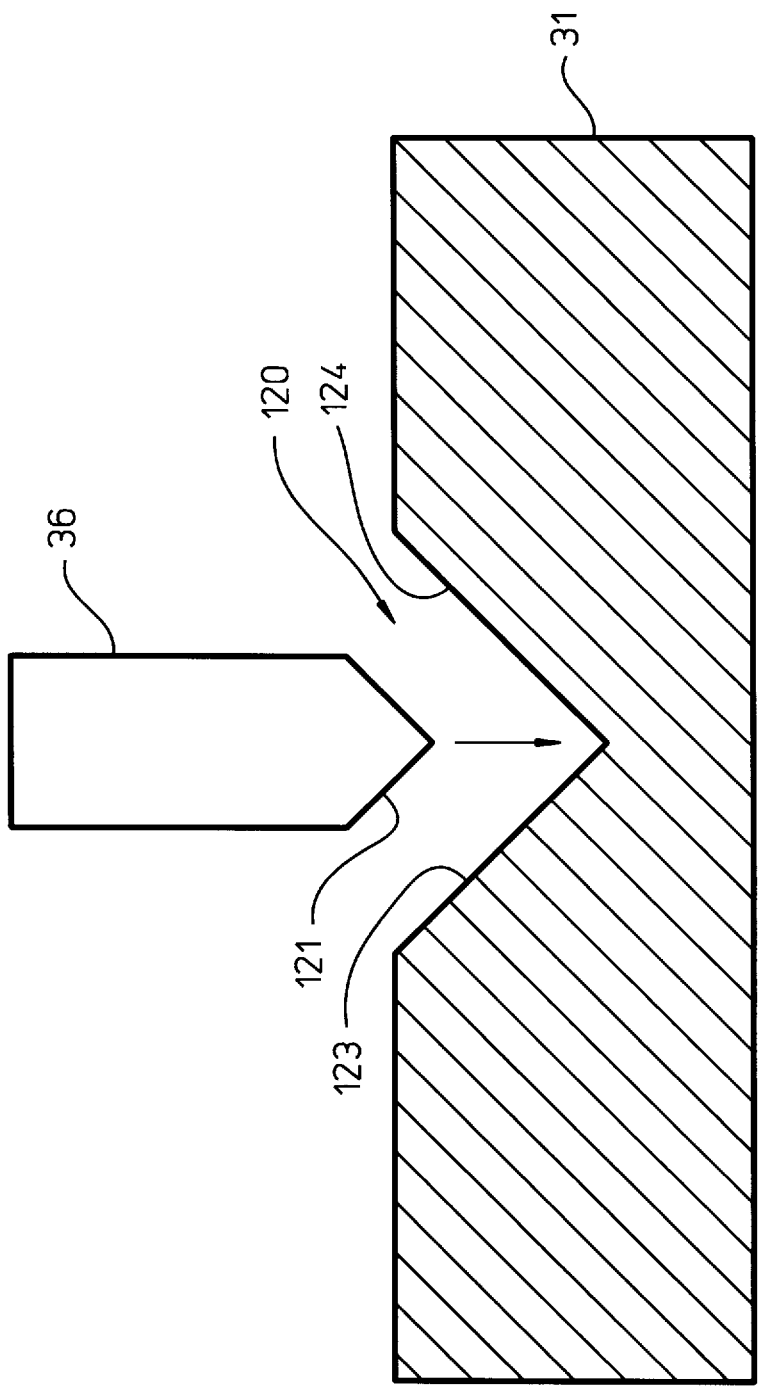
FIG. 10 is a cross-sectional view of the mounting member and the optical filter in the coupling position along line 10—10 of FIG. 3.

Referring back to FIGS. 3–4, to mount all of the components of the photonics module 30 on the mounting member 31, the planar optical filter 36 and the planar mirror 35 need to be mounted on the mounting member 31. FIG. 10 shows the arrangement of mounting the optical filter 36 and the mirror 35 on the mounting member 31 in accordance with one embodiment of the present invention. Because the optical filter 36 and the mirror 35 are mounted in the same manner on the mounting member 31, the arrangement will be described below only with reference to the optical filter 36.

As can be seen from FIG. 10, a groove 120 is formed on the mounting member 31. The groove 120 is, for example, a V-shaped groove and the planar optical filter 36 has a corresponding V-shaped end 121. Glue or other adhesives can be used to bond the optical filter 36 after the optical filter 36 is seated in the groove 121. FIG. 10 shows the mounting member 31 and the optical filter 36 in a coupling position to better illustrate the arrangement of the present invention.

The groove 121 is a precision-formed groove in the mounting member 31. This also means that the location of the groove 121 on the mounting member 31 is precisely defined. When the optical filter 36 is mounted in the groove 121, the optical filter 36 is also precisely mounted and aligned on the mounting member 31.

As described above, because the mounting member 31 is made of <100> silicon, the V-shaped groove 121 is defined on the mounting member 31 using photo-lithographic masking. The groove 121 is then formed using anisotropic etching such that side walls (e.g., the side walls 123 and 124) of the groove 121 lie on the <111> crystallographic planes of the silicon mounting member 31. This causes the side walls 123–124 to intersect the top surface of the mounting member 31 at approximately 54.7° because the <111> planes intersect the <100> surfaces of the mounting member 31 at approximately 54.7°. The V-shaped end 121 of the optical filter 36 can be formed by two saw cuts using, for example, dicing saw. Alternatively, the V-shaped end 121 can be formed by other known means.

If the optical filter 36 is to be vertically mounted on the mounting member 31, then the V-shaped end 121 is formed by two 54.7° symmetrical cuts. If the optical filter 36 is to be tilted on the mounting member 31, then the V-shaped end 121 is formed by two asymmetrical cuts at two different angles. Alternatively, other mounting arrangements can be employed to mount the planar optical filter 36. These other mounting arrangements are shown and described in more detail in the co-pending application Ser. No. 08/705,870, entitled MOUNTING A PLANAR OPTICAL COMPONENT ON A SEMICONDUCTOR MOUNTING MEMBER, filed on the same date as the present application, and assigned to the same assignee of the present application.

Figure 11:
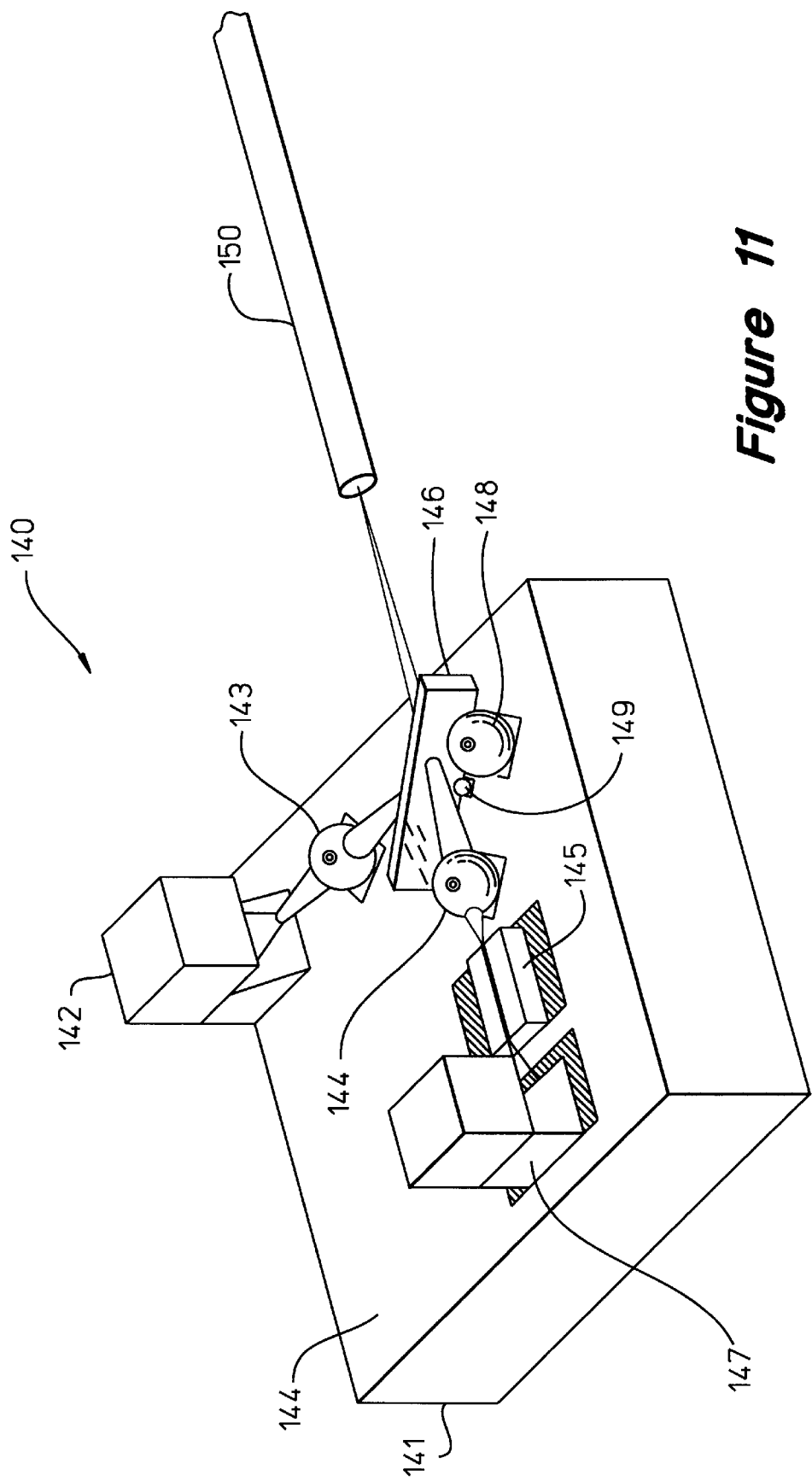
FIG. 11 is a perspective view showing an alternative arrangement of mounting components of a photonics module on a single mounting member.
Figure 12:
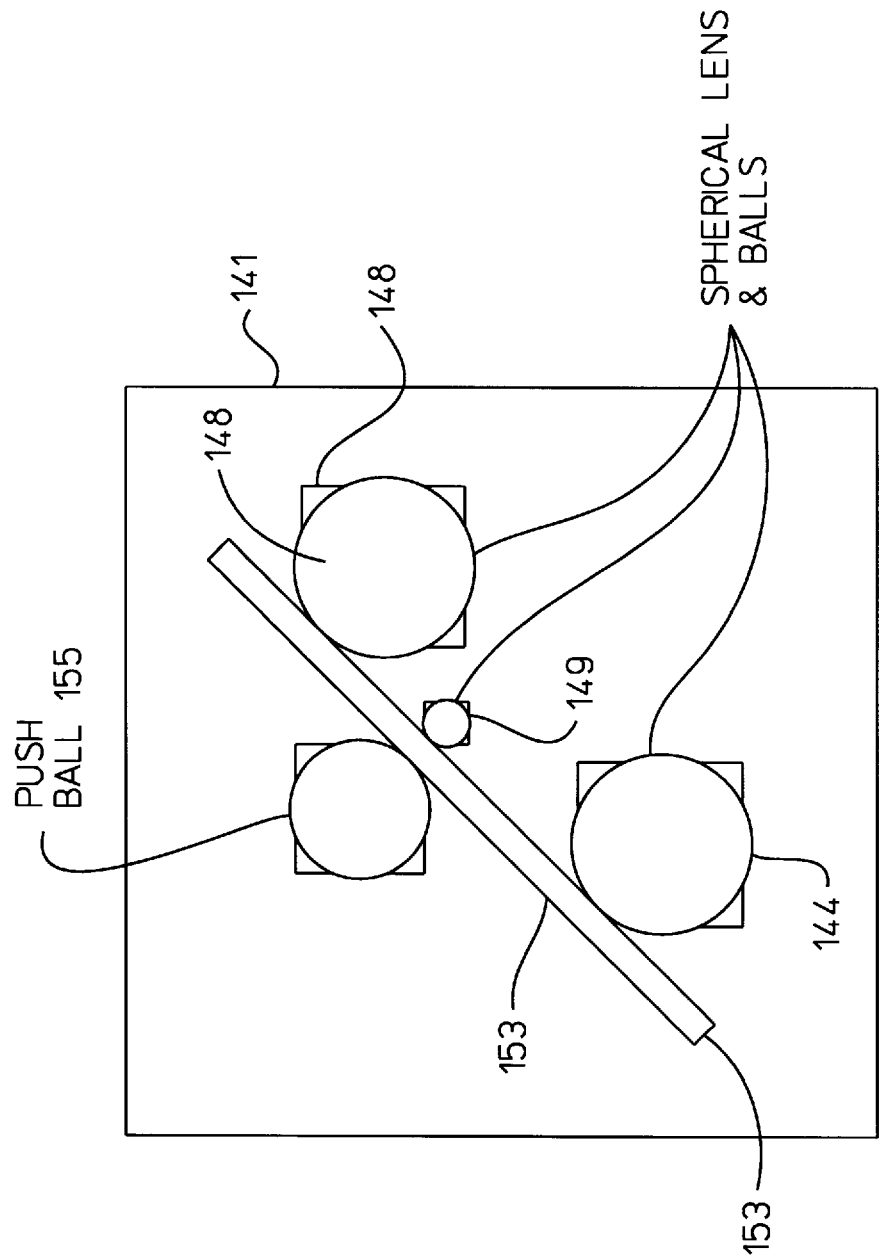
FIG. 12 is a top view of a portion of the mounting member of FIG. 11, illustrating the alternative arrangement.

FIG. 11 shows an arrangement of mounting or integrating the components of a photonics module 140 on a single mounting member 141 which implements an alternative embodiment of the arrangement of FIG. 3. As can be seen from FIGS. 3 and 11, the arrangement of FIG. 11 is identical to that of FIG. 3, except that the optical filter 146 of FIG. 11 is aligned and fixed by the spherical balls 148–149 and the spherical lens 144. In addition, the photonics module 140 of FIG. 11 does not have any mirror. FIG. 12 is a top view that shows in more detail how the optical filter 146 is secured by the spherical lens and balls 144 and 148–149. FIG. 12 also shows a push ball 155 that helps secure the optical filter 146 on the mounting member 141. The spherical lens and balls 144 and 148–149 are placed on the mounting member 141 to define a geometrical plane 153. The planar optical device 146 is then placed on the mounting member 141 against each of the spherical balls 144 and 148–149 such that the planar optical device 146 is placed along the defined geometrical plane 153. This allows the planar optical device 146 to be precisely mounted on the mounting member 141. Glue or other adhesives are then applied to bond the optical filter 146 to the mounting member 141. Again, this arrangement is shown and described in more detail in the co-pending application Ser. No. 08/705,870, entitled MOUNTING A PLANAR OPTICAL COMPONENT ON A SEMICONDUCTOR MOUNTING MEMBER, filed on the same date as the present application, and assigned to the same assignee of the present application.

Figure 13:
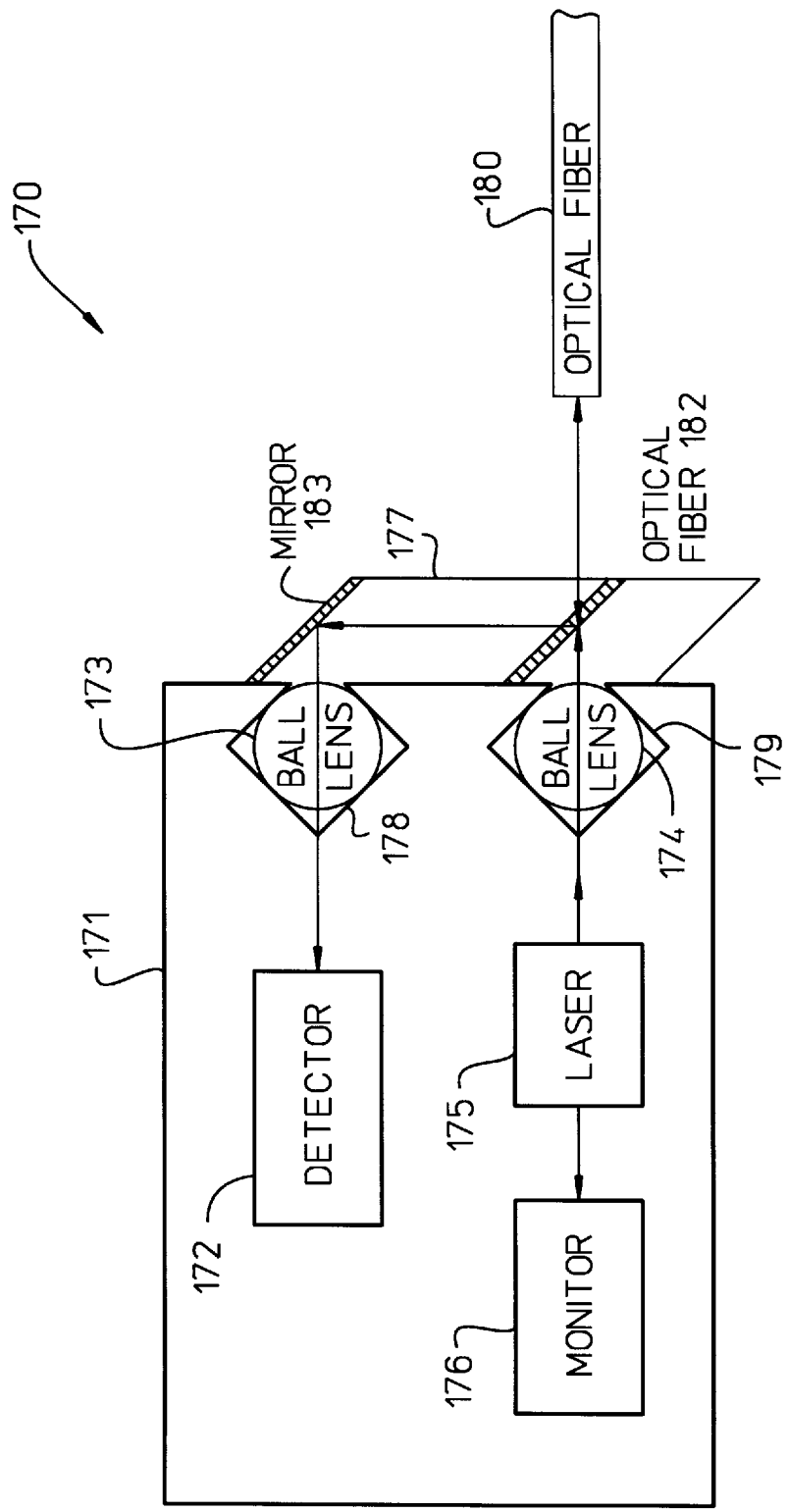
FIG. 13 is a top view of another photonics module having an integrated optical device that includes at least an optical filter and a mirror.

FIG. 13 shows another arrangement of mounting or integrating the components of a photonics module 170 on a single mounting member 171 which implements another alternative embodiment of the arrangement of FIG. 3. As can be seen from FIGS. 3 and 13, the arrangement of FIG. 13 is identical to that shown in FIG. 3, except that the optical filter 182 and the mirror 183 of FIG. 13 are integrated into a single optical device 177 which is then attached to a side surface 185 of the mounting member 171. By integrating the optical filter 182 and the mirror 183 into the single optical device 177, the distance between the mirror 183 and the optical filter 182 is precisely defined. In addition, the integration allows alignments of the optical filter 182 and the mirror 183 with respect to other optical elements of the photonics module 170 to be precisely predefined. Moreover, the integration also allows the integrated optical device 177 to be fabricated at low cost using batch processing. The integrated optical device 177 and the process of fabricating the device are described in more detail in the co-pending application Ser. No. 08/705,872, entitled FABRICATING AN OPTI- CAL DEVICE HAVING AT LEAST AN OPTICAL FILTER AND A MIRROR, filed on the same date, and assigned to the same assignee of the present application.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A photonics apparatus, comprising:
    (A) a plurality of components having at least a first spherical lens;
    (B) a mounting member having a first precision-formed cavity with sloping side walls, wherein the first cavity is a pyramidal cavity, wherein the first spherical lens is seated in the first cavity of the mounting member without requiring any cover member and all the components are precisely aligned on the mounting member without requiring active alignment and additional mounting member.

2. The photonics apparatus of claim 1, wherein the components further comprise a laser, an integrated photo detector, the first spherical lens, and a second spherical lens.

3. The photonics apparatus of claim 2, wherein the components further comprise at least one planar optical element that is one of an optical filter and a mirror.

4. The photonics apparatus of claim 3, further comprising a plurality of spherical positioning balls seated in a plurality of cavities in the mounting member that define a geometrical plane on which the planar optical element is aligned.

5. The photonics apparatus of claim 3, wherein the mounting member further comprises a groove that receives the planar optical element, wherein the planar optical element has an end that is shaped to match the shape of the groove.

6. The photonics apparatus of claim 2, wherein the components further comprise an integrated optical device having at least one optical filter and one mirror spaced apart at a predefined distance.

7. The photonics apparatus of claim 2, wherein the integrated photo detector comprises a surface-detecting photo detector and a mirror.

8. The photonics apparatus of claim 2, wherein the mounting member further comprises a second precision-formed cavity in which the second spherical lens is seated.

9. The photonics apparatus of claim 1, wherein the mounting member is made of silicon and the locations of the components on the mounting member are defined using a photo-lithographic masking and etching process.

* * * * *